United States Patent [19]

Gantzer

[11] Patent Number: 5,064,456
[45] Date of Patent: Nov. 12, 1991

[54] LIQUID VAPOR PURGING SYSTEM

[75] Inventor: Charles J. Gantzer, South Beloit, Ill.

[73] Assignee: Sundstrand Corporation, Rockford, Ill.

[21] Appl. No.: 419,752

[22] Filed: Oct. 11, 1989

Related U.S. Application Data

[63] Continuation-in-part of Ser. No. 139,613, Dec. 30, 1987, Pat. No. 4,913,695.

[51] Int. Cl.$^5$ ............................................. B01D 50/00
[52] U.S. Cl. .................................. 55/385.1; 184/6.23; 184/6.26; 184/6.12; 494/2; 494/5
[58] Field of Search .................. 184/6.23, 6.26, 6.11, 184/6.12; 494/2, 5; 55/385.1

[56] References Cited

U.S. PATENT DOCUMENTS

| | | | |
|---|---|---|---|
| 1,026,075 | 5/1912 | Combs | 55/203 |
| 1,824,540 | 9/1931 | Gronkwist | 184/6.26 |
| 3,161,490 | 12/1964 | Dudek | 55/205 |
| 4,435,193 | 3/1984 | Gullichsen et al. | 55/203 |
| 4,714,139 | 12/1987 | Lorenz et al. | 184/6.24 |
| 4,913,695 | 4/1990 | Gantzer | 184/6.23 |

Primary Examiner—Bernard Nozick
Attorney, Agent, or Firm—Wood, Phillips, Mason, Recktenwald & Van Santen

[57] ABSTRACT

A self-contained liquid vapor purging system for use in such electromotive apparatus as integrated drive generators, or the like, which include a casing and a rotatable shaft extending into the casing. A charge pump circuit communicates with the casing for circulating liquid from the casing and charging liquid back to the casing. An aspirator is located in the charge pump circuit between a charge pump and a inlet to the casing for mixing fresh air with the liquid to deliver an air-liquid mixture to the casing. A centrifugal separator and check valve are incorporated in the rotatable shaft for separating liquid and vapor. The separator includes a vapor-liquid inlet from the casing, a liquid outlet to the casing, and a vapor outlet draining outside the casing. The centifrugal separator includes a valve in communication with the vapor outlet. One form of valve opens only at a predetermined rotary speed of the shaft, and another form of valve opens at a predetermined absolute pressure value.

14 Claims, 2 Drawing Sheets

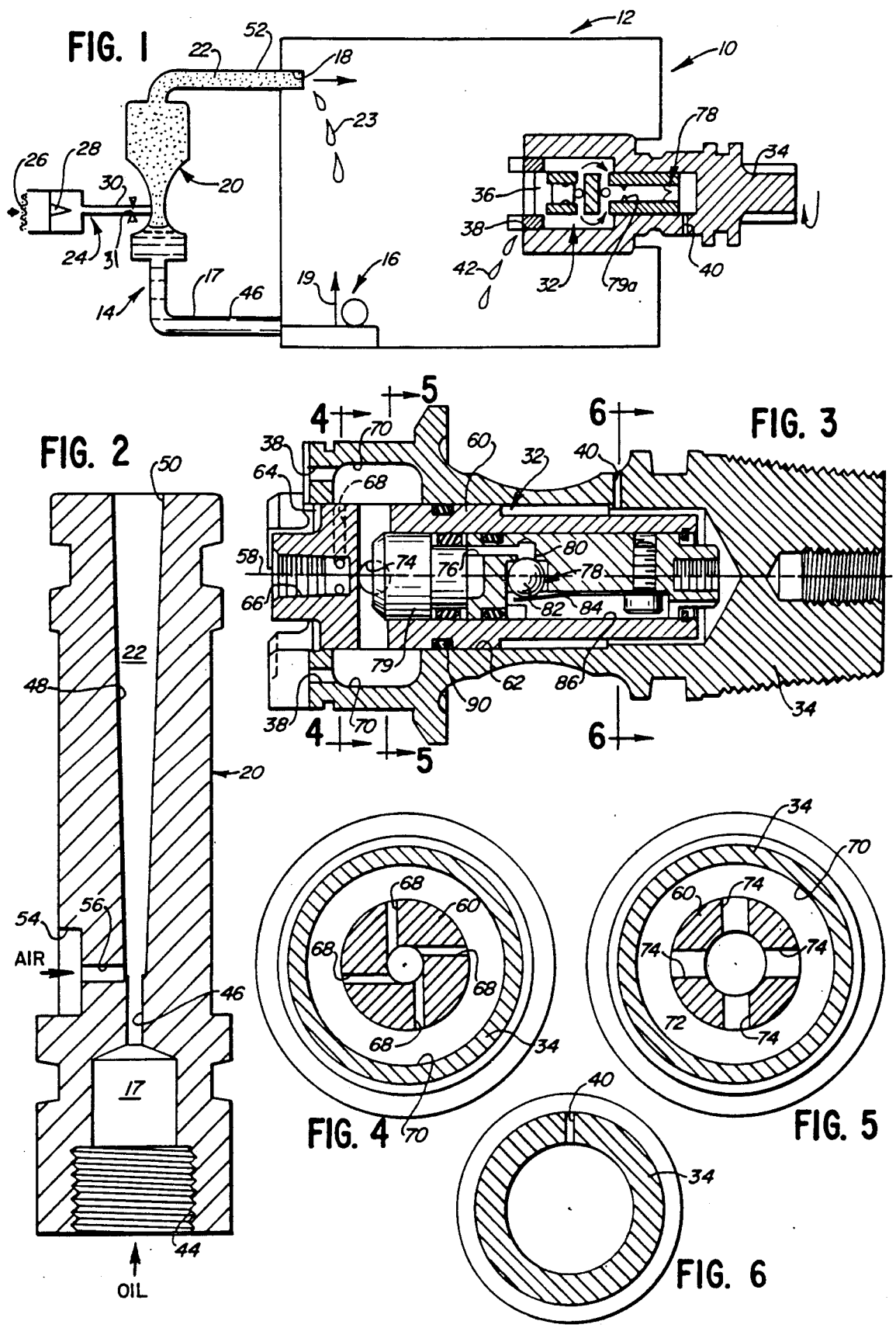

LIQUID VAPOR PURGING SYSTEM

RELATED APPLICATION

This is a continuation-in-part of my copending application Ser. No. 139,613, filed Dec. 30, 1987 and now U.S. Pat. No. 4,913,695 assigned to the assignee of this application.

FIELD OF THE INVENTION

This invention generally relates to a self-contained liquid vapor purging system and, particularly, to an oil/coolant vapor purging system for use in electromotive means such as integrated drive generators, or the like.

BACKGROUND OF THE INVENTION

In the design of aircraft, it is desirable to operate the aircraft accessories with a constant frequency source of electric power. In some conventional systems, an integrated drive generator is used, powered by the aircraft engine. The generator or alternator provided for this purpose must therefore be driven at a constant speed. As aircraft engines usually have a wide speed range to accommodate the varying power requirements of take-off, landing and flight, a constant speed drive transmission driven by the engine and driving the generator or alternator at a constant speed must be provided to maintain a stable source of electric power for the aircraft's electrical accessories. Various parameters are considered in designing such a constant speed transmission, such as the confined envelope or space into which the constant speed transmission is mounted between the engine and the generator or alternator, and the transmission must be capable of delivering considerable power to the alternator under varying environmental conditions and over a wide range of input speeds. Examples of such integrated drive generators are shown in U.S. Pat. Nos. 3,365,981 to Gantzer, dated Jan. 30, 1968, and 4,252,035 to Cordner et al, dated Feb. 24, 1981, both assigned to the assignee of the instant invention.

Such integrated drive generators as described above include a casing with an input shaft extending into the casing to drive the components of the generator. Coolant or oil is used for cooling and lubricating the various components of the drive and generator. Oils commonly used in such applications are hydroscopic, i.e. tend to take on water. Therefore, one of the problems encountered with such systems is that the oil tends to take on or absorb moisture or water during storage externally of the unit or during operation. This is caused by a combination of various factors, such as temperature changes, speed changes, variable loads and the like. This condition is more prominent during high temperature, high humidity conditions. The moisture and other insoluble compounds become entrained in the circulating air/oil mixture which lubricates and cools the integrated drive generator. When the air increases in temperature, the air itself is capable of containing more moisture or water. Consequently, it has become desirable to purge the system, i.e. exchanging the air with dry air periodically during operation. For instance, the air volume may be exchanged every hour.

To further facilitate an understanding of these problems, it should be understood that a lubricating/coolant oil is manufactured by combining an organic acid with an alcohol which combines to form an ester (oil base) plus water. The water is driven off during the manufacturing process of the oil. However, during operation of such electromotive means as integrated drive generators, as described above, as water is taken on or absorbed in the air/oil composition which lubricates and cools the integrated drive generator, the reaction reverses itself and acids again are formed. These acids corrode the casing and other components of an integrated drive generator. Therefore, as temperatures increase on newer and newer applications, the oil becomes increasingly susceptible to water vapor degradation if the vapor cannot be removed.

This invention is directed to solving the above problems by providing a new and improved, simplified and self-contained liquid vapor purging system.

SUMMARY OF THE INVENTION

An object, therefore, of the invention is to provide a new and improved liquid vapor purging system of the character described, particularly for use in such electromotive means as integrated drive generators, or the like, which include casing means and rotatable shaft means extending into the casing means.

In the exemplary embodiment of the invention, the purging system is self-contained and generally includes a charge pump circuit communicating with the casing for circulating liquid (or oil) from the casing and charging liquid back to the casing. Aspirator means are provided in the charge pump circuit for mixing fresh air with the liquid for delivering an air/liquid mixture to the casing. Separator means are incorporated directly in the rotatable shaft means for separating the liquid and vapor, including vapor-liquid inlet means from the casing, liquid outlet means to the casing and vapor outlet means outside the casing.

The aspirator means is located between a charge pump and an inlet to the casing. The aspirator means include ambient air inlet means having an air filter, a check valve to prevent liquid from being forced out of the casing, and a restricting orifice to limit the amount of air flow.

The separator means comprise centrifugal separator means unitary with the shaft means, and the vapor outlet means drains to ambient or overboard. The centrifugal separator means include centrifugal or pressure valve means in communication with the vapor outlet means. In one form of the invention, the pressure valve means is in the form of a radially biased ball valve for opening only at a predetermined rotary speed. In another form of the invention, the pressure valve means is in the form of an aneroid absolute pressure valve member for opening only at a predetermined absolute pressure. The centrifugal separator means also include check valve means in communication with the vapor outlet means for preventing reverse air flow into the casing.

Therefore, it can be seen that the vapor purging system of this invention is self-contained by placing the aspirator means directly into the liquid charge pump circuit and the separator means directly into the rotatable input shaft of the integrated drive generator. This simple, self-contained system thereby is capable of purging or exchanging the volume of air passing through the integrated drive generator, draining the moist air to ambient and adding fresh, dry air to the system.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a somewhat schematic illustration of the self-contained liquid vapor purging system of the invention;

FIG. 2 is an axial section, on an enlarged scale, of the aspirator means of the system;

FIG. 3 is an axial section, on an enlarged scale, of one form of the separator means of the invention incorporated in the rotatable input shaft;

FIG. 4 is an enlarged section taken generally along line 4—4 of FIG. 3;

FIG. 5 is an enlarged section taken generally along line 5—5 of FIG. 3;

FIG. 6 is an enlarged section taken generally along line 6—6 of FIG. 3;

DETAILED DESCRIPTION OF THE PREFERRED EMBODIMENT

Figure 7:
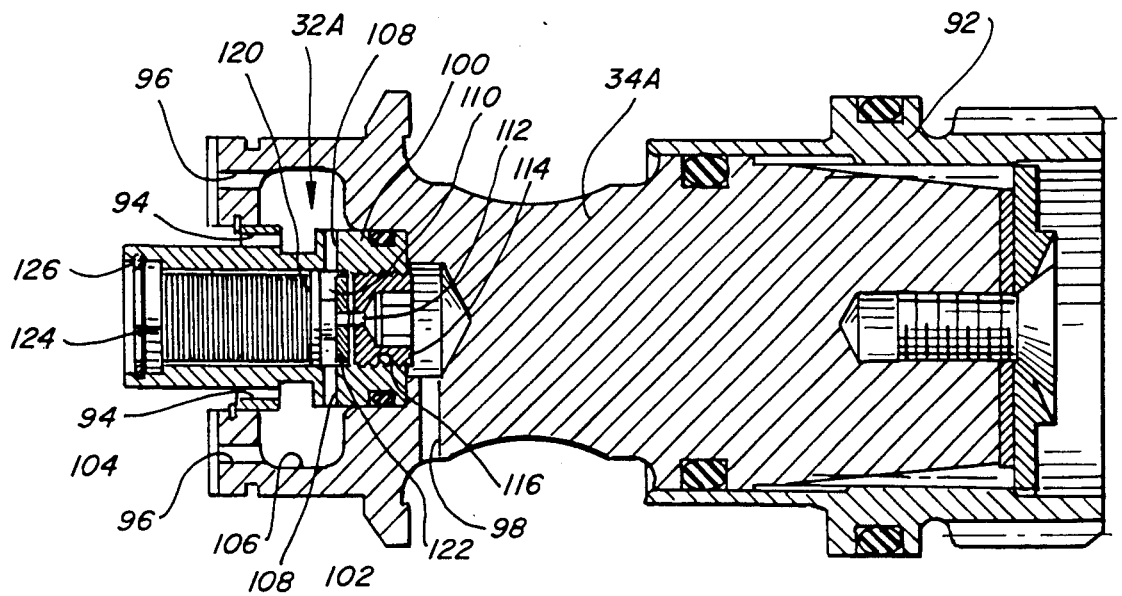
FIG. 7 is an axial section, on an enlarged scale, similar to that of FIG. 3 but of another form of separator means.

Referring to the drawings in greater detail, and first to FIG. 1, the self-contained liquid vapor purging system of this invention, generally designated 10, is illustrated for use in such electromotive means as integrated drive generators, or the like. For simplification purposes, the integrated drive generator is generally designated by block 12. Details of the components of the generator can be derived by reference to the aforementioned U.S. Pat. Nos. 3,365,981 and 4,252,035 which are incorporated herein by reference.

The integrated drive generator includes a charge pump circuit, a portion of which is generally designated 14, and which includes a charge or scavenging pump, generally designated 16. The pump scavenges liquid (coolant/oil) 17 from casing 12 and the charge pump circuit recirculates or charges the oil back to the casing through an inlet means 18. The charge pump may also deliver oil to other hydraulic components, as at 19. Aspirator means, generally designated 20, are provided in the charge pump circuit for mixing fresh air with the oil for delivering an air-oil mixture 22 to casing 12 through inlet 18, as at 23, to cool and lubricate the integrated drive generator. The aspirator means draws ambient air through an inlet couple, generally designated 24, for mixture with oil 17. The inlet couple includes a screen or filter 26, a check valve 28 to prevent liquid (oil) from being forced out of aspirator 20 and an inlet conduit 30 to the aspirator. A restricting orifice, shown schematically at 31, is provided in conduit 30 to limit the amount of air flow, particularly at ground level or low altitudes where ambient air contains more moisture. Although the "fresh" air is drawn from atmosphere, it should be understood that at high altitudes this air is quite dry.

One form of separator means, generally designated 32, are incorporated directly into a rotatable shaft 34 which comprises the input shaft for the integrated drive generator. As will be described in greater detail hereinafter, separator means 32 generally includes an air or vapor/liquid inlet 36 communicating with the interior of casing 12, a liquid or oil outlet 38, and an air or vapor outlet 40. Oil outlet 38 is disposed within casing 12 for returning the separated oil, as at 42, to casing 12. Air outlet 40 is disposed outside casing 12 for draining the moist air or vapor/water to an appropriate overboard drain, i.e. atmosphere.

From the foregoing, it can be seen that a completely self-contained system is afforded by placing aspirator means 20 directly into charge pump circuit 14 and by placing separator means 32 directly into the rotatable input shaft 34. Fresh, dry air is drawn from atmosphere into the aspirator, and purged or moist air is drained to atmosphere as the system continuously purges or exchanges the volume of air in the integrated generator system within casing 12. A complete purging or exchange of the volume of air in the integrated drive generator casing may occur approximately every hour, for example. Therefore, the moisture is reduced to reduce reaction with the oil which would form corrosive acids, and the air and other insoluble compounds are purged from the system.

FIG. 2 shows in greater detail aspirator means 20. More particularly, the aspirator includes an oil inlet coupling portion 44 for connection to conduit means 46 (FIG. 1) from charge pump 16. The aspirator has a restriction or aspirating orifice 46 leading to a diverging passage 48 which terminates at 50 for connection to a conduit means 52 (FIG. 1) of the charge pump circuit 14 which leads to inlet 18 of casing 12 of the integrated drive generator. A coupling portion 54 of aspirator 20 is provided for connecting a cross passage 56 with fresh air inlet 30 (FIG. 1) for admitting fresh air to the aspirator immediately downstream of aspirating orifice 46. The air mixes with oil 17 and fresh air/oil mixture 22 then is supplied to the generator casing.

FIGS. 3–6 show in greater detail separator means 32 incorporated in rotatable shaft 34, i.e. the input or drive shaft of the integrated drive generator. The shaft rotates about an axis 58. More particularly, the separator means includes a plug 60 disposed within an axial bore 62 in shaft 34 and is held therewithin by a retainer ring 64. Moist air, along with entrained oil, enters the separator means through an inlet 66 in the inner distal end of plug 60 on axis 58. A plurality of radially extending passages 68 are formed in plug 60 in communication with inlet 66 and leading to a radially outer oil accumulation chamber 70 in shaft 34. It can be seen in FIG. 4 that radial passages 68 are somewhat tangentially oriented in communication with inlet 66. The inlet leads to a larger axial bore 72 (FIG. 5) in plug 60, and a plurality of larger radial passages 74 extend radially outwardly in communication with oil accumulation chamber 70.

During rotation of shaft 34 and separator plug 60, centrifugal force causes the heavier oil to move radially outwardly through passages 68 into accumulation chamber 70 whereupon the oil returns to casing 12 through oil outlets 38 communicating between the interior of the casing the accumulation chamber 70. The lighter air migrates through inlet 66, through passages 68 and enlarged bore 72, through an orifice 79a (FIG. 1)

of an orifice assembly 79, to an air passageway 76 leading to valve means, generally designated 78. The valve means is in the form of a combined, unitary centrifugal valve or check valve.

More particularly, air passageway 66 leads to a valve seat 80 against which a ball valve 82 is biased by a leaf spring 84. Ball valve 82 and valve seat 80 form a check valve to prevent reverse air flow into the casing of the integrated drive generator. Leaf spring 84 or other suitable means holds the ball valve in engagement with valve seat 80 and opens only at a predetermined rotary speed and/or pressure difference of shaft 34 and plug 60. Upon opening, air flows through passageway 76, past the valve means and into an interior chamber 86 within plug 60. Drain 40 is in communication with chamber 86 and, thereby, the moist air will flow to atmosphere, outside casing 12 or to an appropriate overboard drain. A ring seal 90 prevents oil from migrating from oil chamber 70 to air chamber 86.

The spring rate of leaf spring 84 which holds the check valve in closed condition can be selected for opening at a predetermined pressure or rotary speed of the shaft 34. It also can be seen that ball 82 is offset from the axis of rotation 58 on the spring side of the axis. Such a centrifugal valve means enables the system to allow air within the integrated drive generator casing at high rotary speeds which are encountered during high altitude operation. As is known, the ambient air at higher altitudes is considerably colder and drier than at ground level, i.e. it holds less moisture. Therefore, at slower idling speeds of the aircraft engine which rotates shaft 34, which normally is encountered at ground conditions, drawing in of considerably more moist air is limited. The centrifugal or pressure valve minimizes the entrance of more moist ground air and maximizes the entrance of drier high altitude air.

In addition, in the event of a high altitude engine "shut-down", air is trapped within the system to allow cold restarting. In other words, the aspirator is capable of delivering a given air pressure above the ambient pressure. At altitudes in the event of engine shut-down, the centrifugal or pressure valve will not allow the casing pressure to decay below the desired minimum pressure.

It should be understood that the terms "inlet" (e.g. inlet 36 to separator means 32) and "inlet" (e.g. inlet 18 to casing 12) are used herein and in the claims hereof in relative terms, such as relative to casing 12. In other words, inlet 18 also is an "outlet" from aspirator means 20, and inlet 36 also is an "outlet" from casing 12. The aspirator means may be completely or partially enclosed within the casing or substantially outside thereof and still be within the concepts of the invention. In either instance, communication means 18 is both an outlet from the aspirator and an inlet to the casing. The same is true for communication means 36 and 38 for separator means 30 which may be either inside or outside casing 12 within the inventive concepts.

Figure 8:
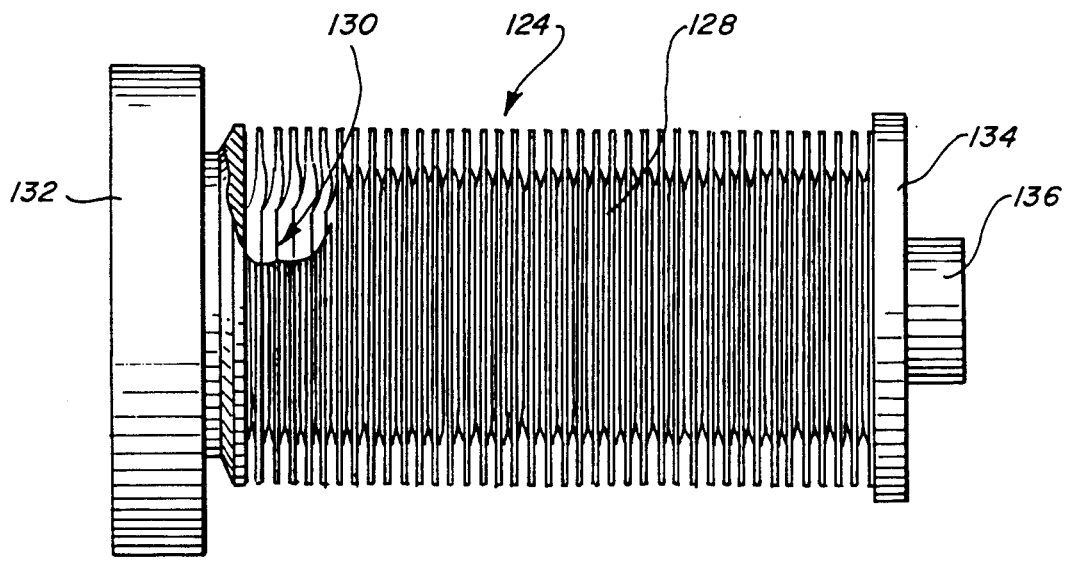
FIG. 8 is a side elevational view, on an enlarged scale and partially cut-away, of the aneroid, bellows-type valve member used in the embodiment of FIG. 7.

FIGS. 7 and 8 show another form of separator means, generally designated 32A, incorporated directly into a rotatable shaft 34A which comprises the input from the integrated drive generator, generally as described in relation to the form of separator means 32 on shaft 34 in FIG. 3. However, FIG. 7 shows that separator means 32A is considerably more compact, with shaft 34A being substantially solid. In addition, shaft 34A is shown splined to a coupling 92 which, itself, may be coupled to the input shaft of the integrated drive generator. Generally, separator means 32A includes an air or vapor/liquid inlet 94 communicating with the interior of casing 12, a liquid or oil outlet 96, and an air or vapor outlet 98. As described in relation to FIG. 3, oil outlet 96 is disposed within casing 12 for returning the separated oil to the casing. Air outlet 98 is disposed outside casing 12 for draining the moist air to an appropriate overboard drain, i.e., atmosphere.

More particularly, separator means 32A includes a plug 100 disposed within an axial bore 102 in shaft 34A and is held therewithin by a retainer ring 104. Moist air, along with entrained oil, passes through inlet 94 and into an accumulation chamber 106 defined by an enlargement of bore 102 in shaft 34A. As the shaft rotates, centrifugal force causes the heavier oil to move radially outwardly in chamber 106, and the oil will move outwardly through outlet 96 and return to casing 12. The lighter air migrates inwardly through radially extending inlets 108 in plug 100 and into a chamber 110 within the plug. The chamber is in communication with air or vapor outlet 98 by means of an orifice 112 which is formed axially through a secondary plug 114 threaded axially into a bore 116 at the inner end of plug 100. Generally, communication between chamber 110 and orifice 112 is controlled by an absolute pressure relief valve means, generally designated 120, which opens only at a predetermined absolute pressure.

In particular, absolute pressure relief valve means 120 includes a resilient disc-like valve seat 122 having a central orifice in registry with orifice 112. The valve seat may be bonded to the inner face of secondary plug 114. An aneroid valve member, generally designated 124, is positioned axially within plug 100 and is held in place by a snap ring 126.

Referring to FIG. 8 in conjunction with FIG. 7, aneroid valve member 124 is in the form of a bellows-like device 128 having an interior chamber, generally designated 130, which is evacuated. The bellows member 128 is sealed at both ends by an outer end disc 132 and an inner end disc 134. Snap ring 126 (FIG. 7) seats against outer end disc 132 to hold the aneroid valve member in position, as described above. A valve plug 136 projects axially inwardly from inner end disc 134 and is of a sufficient diameter to completely cover and close the orifice in resilient valve seat 122 in registry with orifice 112. Therefore, it can be seen that orifice 112 is opened and closed by the action of the aneroid valve member moving valve plug 136 toward and away from valve seat 122. With outer end disc 132 in abutment with snap ring 126, the action of the bellows-type aneroid valve member effectively is a function of the pressure within chamber 110 within plug 100.

As can be understood, with chamber 130 within aneroid valve member 124 evacuated, a predetermined absolute pressure value can be used for the release of air overboard from separator means 32A. This form of separator means, embodying the absolute pressure relief means 120, is advantageous in situations where it is desirable for the separator means to be immune from temperatures, due to the inherent nature of the aneroid valve means. When using valve means incorporating springs, the springs, of course, can expand and contract in response to temperature changes. Due to the nature of the evacuated aneroid valve means of the embodiment of FIGS. 8 and 9, temperature changes have little or no effect on the valve means. In other words, whereas the form of the invention shown in FIG. 3 incorporates a speed responsive valve means, the form of the invention shown in FIG. 7 is responsive only to an absolute pressure value.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A self-contained liquid vapor purging system for use in such electromotive means as integrated drive generators, which include casing means and rotatable shaft means extending into the casing means, comprising:
   charge pump circuit means communicating with said casing means and including pump means for circulating liquid from the casing means and charging liquid back to the casing means;
   aspirator means in the charge pump circuit means for mixing fresh air with the liquid for delivering an air-liquid mixture to the casing means, the aspirator means including ambient air inlet means having restriction orifice means to limit air flow; and
   separator means on said rotatable shaft means for separating liquid and vapor, including vapor-liquid inlet means from the casing means to the separator means, liquid outlet means from the separator means to the casing means and vapor outlet means outside the casing means.

2. The self-contained liquid vapor purging system of claim 1 wherein said ambient air inlet means include liquid check valve means to prevent outflow of liquid.

3. The self-contained liquid vapor purging system of claim 1 wherein said separator means include absolute pressure relief valve means in communication with the vapor outlet means for opening only at a predetermined absolute pressure.

4. The self-contained liquid vapor purging system of claim 3 wherein said absolute pressure relief valve means include an aneroid valve member.

5. The self-contained liquid vapor purging system of claim 4 wherein said aneroid valve member comprises an evacuated, sealed bellows.

6. A liquid and vapor separator system for use with rotary shaft means communicating with a chamber for separating liquid and vapor from the chamber, comprising:
   a rotary shaft extending into the chamber;
   separator means on the rotary shaft for separating liquid and vapor, including vapor-liquid inlet means communicating with the interior of the chamber and vapor outlet means communicating with the exterior of the chamber; and
   absolute pressure relief valve means in communication with the vapor outlet means for opening only at a predetermined absolute pressure.

7. The liquid and vapor separator system of claim 6 wherein said absolute pressure relief valve means include an aneroid valve member.

8. The liquid and vapor separator system of claim 7 wherein said aneroid valve member comprises an evacuated, sealed bellows.

9. A liquid and vapor separator system for use with rotary shaft means communicating with a chamber for separating liquid and vapor from the chamber, comprising:
   a rotary shaft extending into the chamber;
   separator means on the rotary shaft for separating liquid and vapor, including vapor-liquid inlet means communicating with the interior of the chamber and vapor outlet means communicating with the exterior of the chamber; and
   absolute pressure relief valve means in communication with the vapor outlet means for opening only at a predetermined absolute pressure.

10. The liquid and vapor separator system of claim 9 wherein said separator means comprise centrifugal separator means unitary with the shaft means.

11. The liquid and vapor separator system of claim 10 wherein said centrifugal separator means include check valve means in communication with the vapor outlet means for preventing reverse air flow into the casing means.

12. The liquid and vapor separator system of claim 9 wherein said separator means include check valve means in communication with the vapor outlet means for preventing reverse air flow into the casing means.

13. The liquid and vapor separator system of claim 12 wherein said centrifugal valve means and said check valve means comprise a unitary cooperative assembly.

14. The liquid and vapor separator system of claim 13 wherein said centrifugal valve means comprise a radially biased member for holding a check valve against a valve seat.

* * * * *